United States Patent
Ma et al.

(10) Patent No.: US 10,234,622 B2
(45) Date of Patent: Mar. 19, 2019

(54) LIGHT GUIDE PLATE-POSITIONING COLUMN, BACKLIGHT MODULE AND DISPLAY APPARATUS

(71) Applicant: BOE TECHNOLOGY GROUP CO., LTD, Beijing (CN)

(72) Inventors: Yongda Ma, Beijing (CN); Xinyin Wu, Beijing (CN); Jing Su, Beijing (CN); Yuxin Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/785,320

(22) PCT Filed: Mar. 20, 2015

(86) PCT No.: PCT/CN2015/074729
§ 371 (c)(1),
(2) Date: Oct. 16, 2015

(87) PCT Pub. No.: WO2016/082383
PCT Pub. Date: Jun. 2, 2016

(65) Prior Publication Data
US 2016/0363719 A1 Dec. 15, 2016

(30) Foreign Application Priority Data

Nov. 26, 2014 (CN) .................... 2014 2 0720274 U

(51) Int. Cl.
*F21V 8/00* (2006.01)
*G02F 1/1333* (2006.01)
(52) U.S. Cl.
CPC .................... *G02B 6/0088* (2013.01); *G02F 2001/133322* (2013.01)

(58) Field of Classification Search
CPC ............. G02F 1/133608; G02F 1/1333; G02B 6/0088; G02B 2001/133322
(Continued)

(56) References Cited

U.S. PATENT DOCUMENTS 6,392,724 B2 * 5/2002 An ..................... G02B 6/0088
349/58
7,184,110 B2 * 2/2007 Kim ................. G02F 1/133608
349/58
(Continued)

FOREIGN PATENT DOCUMENTS

CN 202149421 U * 2/2012
CN 102537866 A 7/2012
(Continued)

OTHER PUBLICATIONS

Tang et al., Backlight module, Feb. 22, 2012, CN Patent; Google Patents, https://patents.google.com/patent/CN202149421U/en.*
(Continued)

*Primary Examiner* — Anh T Mai
*Assistant Examiner* — Michael Chiang
(74) *Attorney, Agent, or Firm* — Kinney & Lange, P.A.

(57) ABSTRACT

The present disclosure provides a light guide plate-positioning column, a backlight module and a display apparatus. The column comprises a first positioning body for positioning a light guide plate and a second positioning body for positioning an optical film; the second positioning body is located on a side of the first and fixedly connected to it; a projection of the first positioning body in a direction from it toward the second completely covers that of the second, and a projection area of the first positioning body is greater than that of the second; wherein in the direction, a surface on a side of the first positioning body close to the second does not extend beyond a surface on a side of the plate close to the (Continued)

second. Both the requirements of the positioning strength of the plate and the fine positioning of the film can be met.

17 Claims, 1 Drawing Sheet

(58) Field of Classification Search
USPC .............................. 362/615; 349/58, 60, 62
See application file for complete search history.

(56) References Cited

U.S. PATENT DOCUMENTS

| | | | | |
|---|---|---|---|---|
| 8,031,289 | B2* | 10/2011 | Naritomi | G02F 1/133608 |
| | | | | 349/58 |
| 8,439,552 | B2* | 5/2013 | Jeong | G02B 6/0088 |
| | | | | 349/58 |
| 2013/0141651 | A1* | 6/2013 | Kuromizu | G02B 6/0088 |
| | | | | 348/739 |
| 2015/0131307 | A1* | 5/2015 | Huang | G02B 6/0093 |
| | | | | 362/606 |
| 2015/0219838 | A1* | 8/2015 | Jang | G02B 6/0088 |
| | | | | 349/65 |
| 2015/0355404 | A1* | 12/2015 | Lee | G02B 6/0088 |
| | | | | 362/606 |
| 2017/0090113 | A1* | 3/2017 | Yuki | G02B 6/0088 |

FOREIGN PATENT DOCUMENTS

| | | |
|---|---|---|
| CN | 102798035 A | 11/2012 |
| CN | 103256518 A | 8/2013 |
| CN | 204176478 U | 2/2015 |
| JP | 2011249330 A | 12/2011 |

OTHER PUBLICATIONS

Yuki, Lighting device and a display device, Dec. 27, 2016, Patent Pub JP6054583B2; Google Patents, https://patents.google.com/patent/JP6054583B2/.*

International Search Report and Written Opinion for corresponding PCT Application No. PCT/CN2015/074729.

* cited by examiner

LIGHT GUIDE PLATE-POSITIONING COLUMN, BACKLIGHT MODULE AND DISPLAY APPARATUS

CROSS-REFERENCE TO RELATED APPLICATIONS

This application is a Section 371 National Stage Application of International Application No. PCT/CN2015/074729, filed 20 Mar. 2015, which claims priority to Chinese Application No. 201420720274.3, filed on 26 Nov. 2014, incorporated herein by reference in its entirety.

FIELD OF THE INVENTION

The present disclosure relates to a field of display technology, and in particular to a light guide plate-positioning column, a backlight module and a display apparatus.

DESCRIPTION OF THE RELATED ART

A light guide plate-positioning column in a backlight module is mainly used to position a light guide plate and an optical film relative to a back plate. In the prior art, the sizes of the upper portion and the lower portion of the light guide plate-positioning column are usually the same. That is to say, the portion for positioning the light guide plate and the portion for positioning the optical film are the same in shape and in dimension.

Specifically, since the light guide plate is relatively heavy, in a precondition that the material of the light guide plate-positioning column has been determined, a positioning column with a large cross-section area will be required so as to ensure the positioning strength of the light guide plate; but, when the above positioning column suitable for the light guide plate is also used for the positioning of the optical film, the fine positioning of the optical film will not be achieved, whereby causing a large distance from the edge of the visible area to the edge of the optical film, which will hinder a narrow border design.

Instead, in order to satisfy the requirement of the fine positioning of the optical film, a positioning column with a small cross-section area will be required, which will lead to the insufficient positioning strength of the light guide plate. Accordingly, in the process of moving, the relative displacement or collision between the guide plate and the positioning column will occur, which may result in breakage of the light guide plate.

SUMMARY OF THE INVENTION

Embodiments of the present invention provide a light guide plate-positioning column, a backlight module and a display apparatus, which can not only meet the requirements of the positioning strength of the light guide plate, but also achieve the fine positioning of the optical film, which will facilitate a narrow border design.

To achieve the above objects, the following technical solution is employed in an embodiment of the present invention.

A light guide plate-positioning column is provided in an embodiment of the present invention, comprising: a first positioning body for positioning a light guide plate; and a second positioning body for positioning an optical film; wherein the second positioning body is located on a side of the first positioning body and fixedly connected to the first positioning body; wherein a projection of the first positioning body in a direction from the first positioning body toward the second positioning body completely covers a projection of the second positioning body in the same direction, and a projection area of the first positioning body is greater than a projection area of the second positioning body; wherein in the direction from the first positioning body toward the second positioning body, a surface on a side of the first positioning body close to the second positioning body does not extend beyond a surface on a side of the light guide plate close to the second positioning body.

In an embodiment, a length of the first positioning body in a direction from the first positioning body toward the second positioning body is less than or equal to a sum of a thickness of the light guide plate and a thickness of the back plate.

In an embodiment, a length of the first positioning body in a direction from the first positioning body toward the second positioning body is less than or equal to the distance between a surface on a side of the light guide plate facing away from the back plate and a surface on a side of a back plate facing away from the light guide plate.

In an embodiment, the light guide plate-positioning column further comprises a stopper located between the first positioning body and the second positioning body;

the stopper is fixedly connected to the first positioning body for positioning the light guide plate in the direction from the first positioning body toward the second positioning body;

wherein in the direction from the first positioning body toward the second positioning body, a projection of an edge of the stopper extends beyond a projection of an edge of the first positioning body.

In an embodiment, the light guide plate-positioning column is provided with a fluke on the side of the first positioning body facing away from the second positioning body.

In an embodiment, the first positioning body and the second positioning body are formed in single piece.

In an embodiment, a cross-sectional shape of the first positioning body and/or the second positioning body is any one of polygonal shape, circular shape, elliptical shape, and a shape enclosed by an arc and a straight line connecting the two ends of the arc.

An embodiment of the present invention also provides a backlight module including a back plate, a light guide plate, an optical film, and a light guide plate-positioning column as described in any one of the above embodiments, wherein positioning holes through which the light guide plate-positioning column can pass are provided in the back plate, the light guide plate and the optical film, respectively.

In an embodiment, in the case that the light guide plate-positioning column includes a stopper, the light guide plate-positioning column is connected to the back plate by an engaged or riveting connection.

In an embodiment, the light guide plate is provided, at a position corresponding to the positioning hole, with groove in which the stopper is located; and wherein the shape of the groove matches that of the stopper and the depth of the groove is greater than or equal to the thickness of the stopper.

A display apparatus is also provided in an embodiment of the present invention, comprising a backlight module according to any one of the preceding embodiments.

In the light guide plate-positioning column, the backlight module and the display apparatus provided in the embodiments of the present invention, by providing the light guide plate-positioning column as a structure with upper and lower sizes (e.g. diameters) different from each other, positioning the light guide plate with a thick (large in the cross-sectional profile size) first positioning body and positioning the optical film with a thin (small in the cross-sectional profile size) second positioning body, both the requirement of the positioning strength of the light guide plate and the requirement of the fine positioning of the optical film can be met, so that not only the relative movement or collision of the light guide plate due to the excessively thin light guide plate-positioning column can be effectively prevented and the damage to the light guide plate can be avoided, but also the distance from the edge of the visible area to the edge of the optical film can be reduced, which facilitates a narrow border design.

BRIEF DESCRIPTION OF THE DRAWINGS

In order to more clearly illustrate the technical solutions in the embodiments of the present invention, the illustrative drawing in relation to the description of the embodiments or the prior art will be briefly described below.

DETAILED DESCRIPTION OF EMBODIMENTS

The technical solutions of the present disclosure will be clearly and completely described in connection with the drawings in the embodiments of the invention. It is apparent that the described embodiments are only part of the embodiments of the present invention, rather than all of the embodiments. All other embodiments conceived of by those of ordinary skill without creative efforts based on the embodiments of the present invention will fall within the scope of the present invention.

According to the general inventive concept of the present disclosure, a light guide plate-positioning column is provided, comprising: a first positioning body for positioning a light guide plate and a second positioning body for positioning an optical film; the second positioning body is located on a side of the first positioning body and fixedly connected to the first positioning body; the projection of the first positioning body in a direction from the first positioning body toward the second positioning body completely covers the projection of the second positioning body in the same direction, and the projection area of the first positioning body is greater than the projection area of the second positioning body; wherein in the direction from the first positioning body toward the second positioning body, a surface on a side of the first positioning body close to the second positioning body does not extend beyond a surface on a side of the light guide plate close to the second positioning body.

In addition, for the purpose of explanation, numerous specific details are set forth in the following detailed description to provide a thorough understanding to the embodiments of the present invention. It is obvious, however, that one or more embodiments can also be implemented without these specific details. In other instances, well-known structures and devices are shown in an illustrative manner so as to simplify the drawings.

Figure 1:
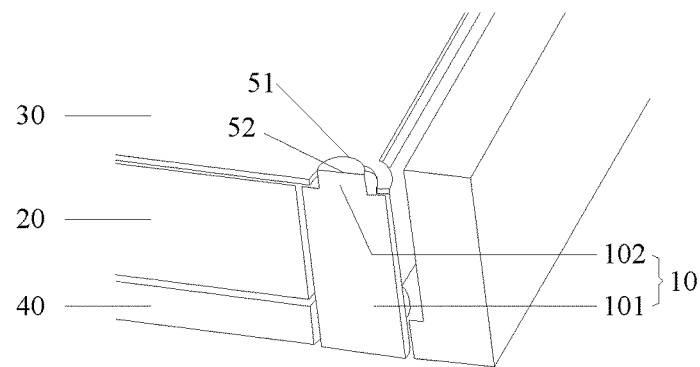
FIG. 1 is a schematic view of a backlight module according to an embodiment of the invention.

A light guide plate-positioning column 10 is provided in an embodiment of the present invention, as shown in FIG. 1. The light guide plate-positioning column 10 includes: a first positioning body 101 for positioning a light guide plate 20 and a second positioning body 102 for positioning an optical film 30; the second positioning body 102 is located on a side of the first positioning body 101 and fixedly connected to the first positioning body 101; the projection of the first positioning body 101 in a direction from the first positioning body 101 toward the second positioning body 102 completely covers the projection of the second positioning body 102 in the same direction, and the projection area of the first positioning body 101 is greater than the projection area of the second positioning body 102; wherein in the direction from the first positioning body 101 toward the second positioning body 102, a surface on a side of the first positioning body 101 close to the second positioning body 102 (e.g., as shown in FIG. 1, the upper surface of the first positioning body 101) does not extend beyond a surface on a side of the light guide plate 20 close to the second positioning body 102 (e.g., as shown in FIG. 1, the upper surface of the light guide plate 20). The above term "projection" means, for example, a projection on a plane perpendicular to the direction from the first positioning body 101 toward the second positioning body 102.

It should be noted that, firstly, the fixed connection between the first positioning body 101 and the second positioning body 102 can be achieved in such a manner that the first positioning body 101 and the second positioning body 102 are formed in single piece or the mutually fixed connection between the first positioning body 101 and the second positioning body 102 can be achieved by means of a mechanical structure.

Secondly, the first positioning body 101 can have the same shape as the second positioning body 102 and, in this case, the cross-sectional profile size of the first positioning body 101 is necessarily greater than that of the second positioning body 102. Alternatively, the first positioning body 101 can be different from the second positioning body 102 in shape, and in this case, it will be enough only to ensure that the outer profile projection of the first positioning body 101 in the direction from the first positioning body 101 toward the second positioning body 102 (i.e., a direction perpendicular to the light guide plate 20), for example, on a plane perpendicular to the direction from the first positioning body 101 toward the second positioning body 102, extends beyond the outer profile projection of the second positioning body 102.

Thirdly, as an example, provided that the light exit direction of the backlight module is the upward direction, the upper surface of the first positioning body 101 cannot extend beyond the upper surface of the light guide plate 20; on this basis, it should be understood by the skilled person in the art that, in order to achieve a relative positioning between the light guide plate 20 and the back plate, it is necessary for the first positioning body 101 to pass through both the positioning hole in the light guide plate 20 and the positioning hole in the back plate; wherein the positioning hole in the light guide plate 20 and the positioning hole in the back plate are configured to allow the first positioning body 101 to pass through it, in order to achieve the relative positioning between the light guide plate 20 and the back plate in a direction parallel to the light guide plate 20.

A light guide plate-positioning column 10 is provided in an embodiment of the present invention, comprising: a first positioning body 101 for positioning a light guide plate 20 and a second positioning body 102 for positioning an optical film 30; the second positioning body 102 is located on a side of the first positioning body 101 and fixedly connected to the first positioning body 101; the projection of the first positioning body 101 in a direction from the first positioning body 101 toward the second positioning body 102 completely covers the projection of the second positioning body 102 in the same direction, and the projection area of the first positioning body 101 is greater than the projection area of the second positioning body 102; wherein in the direction from the first positioning body 101 toward the second positioning body 102, a surface on a side of the first positioning body 101 close to the second positioning body 102 does not extend beyond a surface on a side of the light guide plate 20 close to the second positioning body 102.

In view of the above, in the embodiments of the present invention, the light guide plate-positioning column 10 is provided as a structure with upper and lower sizes different from each other (e.g. different cross-sectional diameters), and the light guide plate 20 is positioned with a thick (large in the cross-sectional profile size) first positioning body 101 and the optical film 30 is positioned with a thin (small in the cross-sectional profile size) second positioning body 102. In this way, both the requirement of the positioning strength of the light guide plate and the requirement of the fine positioning of the optical film can be met, so that not only the relative movement or collision of the light guide plate due to the excessively thin light guide plate-positioning column can be effectively prevented and the damage to the light guide plate can be avoided, but also the distance from the edge of the visible area to the edge of the optical film can be reduced, which facilitates a narrow border design.

Based on the above description, as an example, the first positioning body 101 and the second positioning body 102 can be formed in single piece so as to ensure the secure connection between the first positioning body 101 and the second positioning body 102.

On this basis, alternatively, the cross-sectional shape of the first positioning body 101 and/or the second positioning body 102 may be any one of polygonal shape, circular shape, elliptical shape, and a shape enclosed by an arc 51 and a straight line 52 connecting the two ends of the arc 51; of course, the cross-sectional shape of the first positioning body 101 and/or the second positioning body 102 can be set as any other irregular shapes according to the requirements.

In an example, the first positioning body 101 can have the same cross-sectional shape as the second positioning body 102 and, in this case, it will be enough only to ensure that the cross-sectional profile size of the first positioning body 101 is greater than that of the second positioning body 102. Alternatively, the first positioning body 101 can be different from the second positioning body 102 in the cross-sectional shape, and in this case, it will be enough only to ensure that the outer profile projection of the first positioning body 101 in the direction from the first positioning body 101 toward the second positioning body 102 extends beyond the outer profile projection of the second positioning body 102.

It should be noted that the first positioning body 101 is used to position the light guide plate 20, and the second positioning body is used to position the optical film 30, whereby the cross-sectional shapes and sizes of the first positioning body 101 and the second positioning body 102 should be adapted to position the light guide plate 20 and the optical film 30.

Alternatively, with reference to FIG. 1, the length of the first positioning body 101 in the direction from the first positioning body 101 toward the second positioning body 102 may be less than or equal to the distance between a surface on a side of the light guide plate 20 facing away from the back plate 40 and a surface on a side of the back plate 40 facing away from the light guide plate 20. Or, the length of the first positioning body 101 in the direction from the first positioning body 101 toward the second positioning body 102 is less than or equal to the sum of the thickness of the light guide plate 20 and the thickness of the back plate 40.

In this case, the length of the first positioning body 101 in the direction from the first positioning body 101 toward the second positioning body 102 should be able to simultaneously pass through the light guide plate 20 and the back plate 40, so that the first positioning body 101 can restrict the relative position between the light guide plate 20 and the back plate 40 in a direction parallel to the light guide plate 20.

Based on the above, it is necessary to provide positioning holes through which the first positioning body 101 can pass, in the light guide plate 20 and the back plate 40, and the shape and the dimension of the positioning hole should be matched to those of the first positioning body 101. On this basis, other components such as a reflective sheet, and the like may be provided between the light guide plate 20 and the back plate 40 and then the same positioning holes may be provided at a position corresponding to the other components such as the reflective sheet, and the like. As an example, the positioning holes in the light guide plate 20 and those in the back plate 40 are align with each other respectively. For example, in the case where other components such as a reflective sheet, and the like are provided, the positioning holes in the other components such as the reflective sheet should also be aligned with the positioning holes in the guide plate 20 and the back plate 40 respectively.

It can be seen from the above that, in fact, the first positioning body 101 needs to pass through the light guide plate 20 and the back plate 40 as well as other components located therebetween such as a reflection sheet, and the like, and therefore, the length of the first positioning body 101 may be identical to the thickness from the upper surface of the light guide plate 20 to the lower surface of the back plate 40, and it will be enough only if it is ensured that the second positioning body 102 can pass through the optical film 30 in order to restrict its relative position.

Based on the above structure, the light guide plate 20 and the optical film 30 can be positioned with respect to the back plate 40 in a direction parallel to the light guide plate 20.

Figure 2:
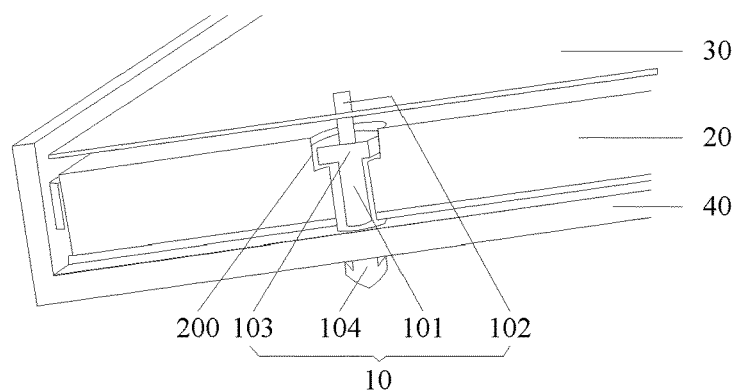
FIG. 2 is a schematic view of a backlight module according to an embodiment of the invention.
Figure 3:
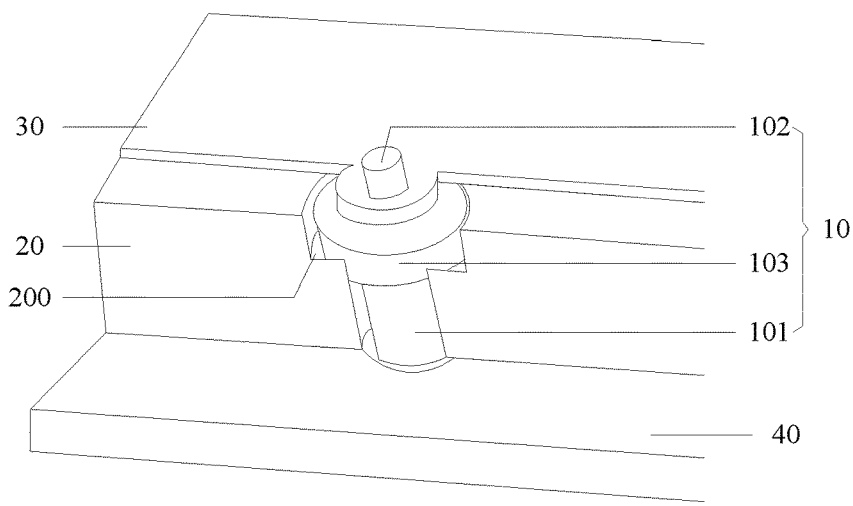
FIG. 3 is a schematic view of a backlight module according to an embodiment of the invention.

In order to obtain a relatively high positioning accuracy in a direction perpendicular to the light guide plate 20, alternatively, as shown in FIG. 2 and FIG. 3, the light guide plate-positioning column 10 may further comprise a stopper 103 located between the first positioning body 101 and the second positioning body 102; the stopper 103 is used to position the light guide plate 20 in the direction from the first positioning body 101 toward the second positioning body 102.

The projection of the edge of the stopper 103 in the direction from the first positioning body 101 toward the second positioning body 102, i.e., the direction perpendicular to the light guide plate 20, for example, on a plane perpendicular to the direction from the first positioning body 101 toward the second positioning body 102, extends beyond the projection of the edge of the first positioning body 101.

It should be noted that the stopper 103 and the first 101 and/or second 102 positioning bodies can be formed in single piece, and the fixed connection between them can be achieved in another manner. The specific connecting manners described above are not intended to be a limit to the present invention.

Here, the cross-sectional shape of the stopper 103 can be any one of polygonal shape, circular shape, elliptical shape, and a shape enclosed by an arc and a straight line connecting the two ends of the arc, and, of course, can be any other irregular shapes.

It should be noted that, the projection of the edge of the stopper 103 in the direction perpendicular to the light guide plate 20, for example, on a plane perpendicular to the direction from the first positioning body 101 toward the second positioning body 102, extends beyond the projection of the edge of the first positioning body 101 may specifically comprise two following aspects.

On one hand, the stopper 103 is a solid cylinder structure which can be in contact with both the first positioning body 101 and the second positioning body 102, and the projection of the edge of the outer profile of the stopper 103 extends beyond the projection of the edge of the outer profile of the first positioning body 101. Alternatively, the stopper 103 is a hollow cylinder structure 103. That is to say, it will be enough only if the stopper 103 can maintain the fixed connection between the stopper 103 and the first positioning body 101, and it will not be necessary for the stopper 103 to be in contact with the second positioning body 102. At the same time, the projection of the edge of the outer profile of the stopper 103 extends beyond the projection of the edge of the outer profile of the first positioning body 101.

On the other hand, the projection of the edge of the outer profile of the stopper 103 may extend beyond the projection of the edge of the outer profile of the first positioning body 101 in each direction, or the projection of the edge of the outer profile of the stopper 103 may extend beyond the projection of the edge of the outer profile of the first positioning body 101 in finite (at least two) directions. It will be enough in embodiments of the present invention only to ensure that the stopper 103 can function in a direction perpendicular to the light guide plate 20 to restrict its relative position.

On this basis, with reference to FIG. 2, the light guide plate-positioning column 10 and the back plate 40 may be engaged to each other by providing a fluke 104 on a side of the first positioning body 101 facing away from the second positioning body 102.

Thus, the light guide plate 20 may be positioned by the stopper 103 and the fluke 104 in the direction perpendicular to the light guide plate 20; the light guide plate 20 may be positioned by the first positioning body 101 and the positioning hole disposed in the light guide plate 20 in the direction parallel to the light guide plate 20. It can be seen that such positioning manner can restrict the light guide plate 20 stably in all directions so that the relative movement or collision of the light guide plate 20 can be effectively prevented and the damage to the light guide plate can be avoided.

Of course, the light guide plate-positioning column 10 may also be connected to the back plate 40 by a connecting method such as a riveting connection, and the like. The specific connecting structure between the light guide plate-positioning column 10 and the back plate 40 will not be described in detail below.

A backlight module is also provided in an embodiment of the present invention, with reference to FIGS. 1-3, including a back plate 40, a light guide plate 20, an optical film 30, and a light guide plate-positioning column 10 described above.

In an example, positioning holes through which the light guide plate-positioning column 10 can pass are provided in the back plate 40, the light guide plate 20 and the optical film 30, respectively.

It should be noted that, the positioning holes provided in the back plate 40 and the optical film 30 are required to be completely closed positioning holes, and the positioning hole provided in the light guide plate 20 may be completely closed or semi-closed positioning hole. In addition, the positioning hole in the optical film 30 may be formed by directly drilling a hole in the body region of the optical film 30 or by additionally providing a lug on a side of the optical film 30.

On this basis, with reference to FIG. 1, since the light guide plate-positioning column 10 includes the first positioning body 101 and the second positioning body 102, and the first positioning body 101 and the second positioning body 102 are different from each other in shape and size, the positioning holes provided in the light guide plate 20 and the back plate 40 should be matched to the positioning body 101, and the positioning hole provided in the optical film 30 should be matched to the second positioning body 102.

Thus, in the process of assembling the backlight module, by positioning the light guide plate 20 with a thick (large in the cross-sectional profile size) first positioning body 101 and positioning the optical film 30 with a thin (small in the cross-sectional profile size) second positioning body 102, both the requirement of the positioning strength of the light guide plate and the requirement of the fine positioning of the optical film can be met, so that not only the relative movement or collision of the light guide plate can be effectively prevented and the damage to the light guide plate can be avoided, but also the distance from the edge of the visible area to the edge of the optical film can be reduced, which facilitates a narrow border design.

The light guide plate 20 can only be positioned in the direction parallel to the light guide plate 20 in the positioning manner shown in FIG. 1, and will not be restricted in the direction perpendicular to the light guide plate 20. On this basis, with reference to FIGS. 2 and 3, the light guide plate-positioning column 10 may also include a stopper 103. In this case, the light guide plate-positioning column 10 and the back plate 40 can be connected by an engaged or riveting connection. In this way, the light guide plate 20 can be positioned with respect to the back plate 40 by the stopper 103. In one example, when the light guide plate-positioning column 10 is connected to the back plate 40 by an engaged connection, the light guide plate-positioning column 10 is further provided with a fluke 104 on a side thereof close to the back plate 40.

Alternatively, the guide plate 20 is provided, at a position corresponding to the positioning holes, with groove 200 in which the stopper 103 is located. In an example, the shape of the groove 200 matches that of the stopper 130 and the depth of the groove 200 is greater than or equal to the thickness of the stopper 103.

In this case, the surface on the side of the stopper 103 close to the first positioning body 101 (i.e., as shown in FIGS. 2-3, the lower surface of the stopper 103) is flush with the inner surface of the grooves 200, and the surface on the side of the first positioning body 101 facing away from the stopper 103 (i.e., as shown in FIGS. 2-3, the lower surface of the first positioning body 101) may extend beyond the lower surface of the back plate 40.

A display apparatus is also provided in an embodiment of the present invention, comprising a display panel and a backlight module described above.

Here, the display apparatus may be a non-self-luminous type display apparatus such as a liquid crystal display or a liquid crystal TV, which can be provided with backlight by a backlight module provided in the embodiment of the present invention so that not only the relative movement or collision of the light guide plate can be effectively prevented and the damage to the light guide plate can be avoided, but also the distance from the edge of the visible area to the edge of the optical film can be reduced, which achieves the fine positioning of the optical film and facilitates a narrow border design.

The above description is only the specific embodiment of the present invention, and the scope of the present invention is not limited to this. A person of ordinary skill in the art can easily conceive of modifications and substitutes that can fall within the scope of the present invention by means of the present disclosure. Accordingly, the protection scope of the disclosure should be defined by the scope claimed by the claims.

The invention claimed is:

1. A light guide plate-positioning column comprising:
   a first positioning body for positioning a light guide plate; and
   a second positioning body for positioning an optical film;
   wherein the second positioning body is located on a side of the first positioning body and fixedly connected to the first positioning body;
   wherein a projection of the first positioning body in a direction from the first positioning body toward the second positioning body completely covers a projection of the second positioning body in the same direction, and a projection area of the first positioning body is greater than a projection area of the second positioning body;
   wherein in the direction from the first positioning body toward the second positioning body, a surface on a side of the first positioning body close to the second positioning body does not extend beyond a surface on a side of the light guide plate close to the second positioning body;
   wherein a length of the first positioning body in the direction from the first positioning body toward the second positioning body is equal to a sum of a thickness of the light guide plate and a thickness of a back plate;
   wherein the light guide plate-positioning column further comprises a stopper located between the first positioning body and the second positioning body;
   wherein the stopper is fixedly connected to the first positioning body for positioning the light guide plate in the direction from the first positioning body toward the second positioning body;
   wherein in the direction from the first positioning body toward the second positioning body, a projection of an edge of the stopper extends beyond a projection of an edge of the first positioning body in finite directions;
   wherein the stopper is a hollow cylinder structure; and
   wherein the stopper is fixedly connected to the first positioning body, but is not in contact with the second positioning body.

2. The light guide plate-positioning column according to claim 1,
   wherein a length of the first positioning body in the direction from the first positioning body toward the second positioning body is less than or equal to the distance between a surface on a side of the light guide plate facing away from a back plate and a surface on a side of the back plate facing away from the light guide plate.

3. The light guide plate-positioning column according to claim 2, wherein a cross-sectional shape of the first positioning body and/or the second positioning body is any one of polygonal shape, circular shape, elliptical shape, and a shape enclosed by an arc and a straight line connecting the two ends of the arc.

4. The light guide plate-positioning column according to claim 1,
   wherein the light guide plate-positioning column is provided with a fluke on the side of the first positioning body facing away from the second positioning body.

5. The light guide plate-positioning column according to claim 4, wherein a cross-sectional shape of the first positioning body and/or the second positioning body is any one of polygonal shape, circular shape, elliptical shape, and a shape enclosed by an arc and a straight line connecting the two ends of the arc.

6. The light guide plate-positioning column according to claim 1,
   wherein the first positioning body and the second positioning body are formed in single piece.

7. The light guide plate-positioning column according to claim 6, wherein a cross-sectional shape of the first positioning body and/or the second positioning body is any one of polygonal shape, circular shape, elliptical shape, and a shape enclosed by an arc and a straight line connecting the two ends of the arc.

8. The light guide plate-positioning column according to claim 1,
   wherein a cross-sectional shape of the first positioning body and/or the second positioning body is any one of polygonal shape, circular shape or elliptical shape, and a shape enclosed by an arc and a straight line connecting the two ends of the arc.

9. A backlight module including a back plate, a light guide plate, an optical film, and a light guide plate-positioning column according to claim 1,
   wherein positioning holes through which the light guide plate-positioning column passes are provided in the back plate, the light guide plate and the optical film, respectively.

10. The backlight module according to claim 9,
    wherein the light guide plate-positioning column is connected to the back plate by an engaged or riveting connection.

11. The backlight module according to claim 10,
    wherein the light guide plate is provided, at a position corresponding to the positioning hole, with a groove in which the stopper is located; and
    wherein the shape of the groove matches that of the stopper and the depth of the groove is greater than or equal to the thickness of the stopper.

12. A display apparatus comprising the backlight module according to claim 9.

13. The backlight module according to claim 9, wherein a length of the first positioning body in the direction from the first positioning body toward the second positioning body is less than or equal to the distance between a surface on a side of the light guide plate facing away from the back plate and a surface on a side of a back plate facing away from the light guide plate.

14. The backlight module according to claim 9, wherein the light guide plate-positioning column is provided with a fluke on the side of the first positioning body facing away from the second positioning body.

15. A light guide plate-positioning column comprising:
    a first positioning body for positioning a light guide plate; and
    a second positioning body for positioning an optical film;

wherein the second positioning body is located on a side of the first positioning body and fixedly connected to the first positioning body;

wherein a projection of the first positioning body in a direction from the first positioning body toward the second positioning body completely covers a projection of the second positioning body in the same direction, and a projection area of the first positioning body is greater than a projection area of the second positioning body;

wherein in the direction from the first positioning body toward the second positioning body, a surface on a side of the first positioning body close to the second positioning body does not extend beyond a surface on a side of the light guide plate close to the second positioning body;

wherein a cross-sectional shape of the first positioning body and/or the second positioning body is a shape enclosed by an arc and a straight line connecting the two ends of the arc;

wherein the light guide plate-positioning column further comprises a stopper located between the first positioning body and the second positioning body;

wherein the stopper is fixedly connected to the first positioning body for positioning the light guide plate in the direction from the first positioning body toward the second positioning body;

wherein in the direction from the first positioning body toward the second positioning body, a projection of an edge of the stopper extends beyond a projection of an edge of the first positioning body in finite directions;

wherein the stopper is a hollow cylinder structure; and wherein the stopper is fixedly connected to the first positioning body, but is not in contact with the second positioning body.

16. A light guide plate-positioning column comprising:
a first positioning body for positioning a light guide plate; and
a second positioning body for positioning an optical film;
  wherein the second positioning body is located on a side of the first positioning body and fixedly connected to the first positioning body;
  wherein a projection of the first positioning body in a direction from the first positioning body toward the second positioning body completely covers a projection of the second positioning body in the same direction, and a projection area of the first positioning body is greater than a projection area of the second positioning body;
  wherein in the direction from the first positioning body toward the second positioning body, a surface on a side of the first positioning body close to the second positioning body does not extend beyond a surface on a side of the light guide plate close to the second positioning body;
  wherein a length of the first positioning body in the direction from the first positioning body toward the second positioning body is equal to a sum of a thickness of the light guide plate and a thickness of a back plate;
  wherein the light guide plate-positioning column further comprises a stopper located between the first positioning body and the second positioning body;
  wherein the stopper is fixedly connected to the first positioning body for positioning the light guide plate in the direction from the first positioning body toward the second positioning body;
  wherein in the direction from the first positioning body toward the second positioning body, a projection of an edge of the stopper extends beyond a projection of an edge of the first positioning body;
  wherein the stopper is a hollow cylinder structure;
  wherein the stopper is fixedly connected to the first positioning body, but is not in contact with the second positioning body; and
  wherein the stopper is configured to limit a position of the light guide plate in a direction perpendicular to the light guide plate.

17. A light guide plate-positioning column comprising:
a first positioning body for positioning a light guide plate; and
a second positioning body for positioning an optical film;
  wherein the second positioning body is located on a side of the first positioning body and fixedly connected to the first positioning body;
  wherein a projection of the first positioning body in a direction from the first positioning body toward the second positioning body completely covers a projection of the second positioning body in the same direction, and a projection area of the first positioning body is greater than a projection area of the second positioning body;
  wherein in the direction from the first positioning body toward the second positioning body, a surface on a side of the first positioning body close to the second positioning body does not extend beyond a surface on a side of the light guide plate close to the second positioning body;
  wherein a cross-sectional shape of the first positioning body and/or the second positioning body is a shape enclosed by an arc and a straight line connecting the two ends of the arc;
  wherein the light guide plate-positioning column further comprises a stopper located between the first positioning body and the second positioning body;
  wherein the stopper is fixedly connected to the first positioning body for positioning the light guide plate in the direction from the first positioning body toward the second positioning body;
  wherein in the direction from the first positioning body toward the second positioning body, a projection of an edge of the stopper extends beyond a projection of an edge of the first positioning body;
  wherein the stopper is a hollow cylinder structure;
  wherein the stopper is fixedly connected to the first positioning body, but is not in contact with the second positioning body; and
  wherein the stopper is configured to limit a position of the light guide plate in a direction perpendicular to the light guide plate.

* * * * *